Aug. 22, 1961   J. H. FRY   2,996,974
SINGLE UNIT ROTARY COFFEE BREWER
Filed Oct. 14, 1957   2 Sheets-Sheet 2
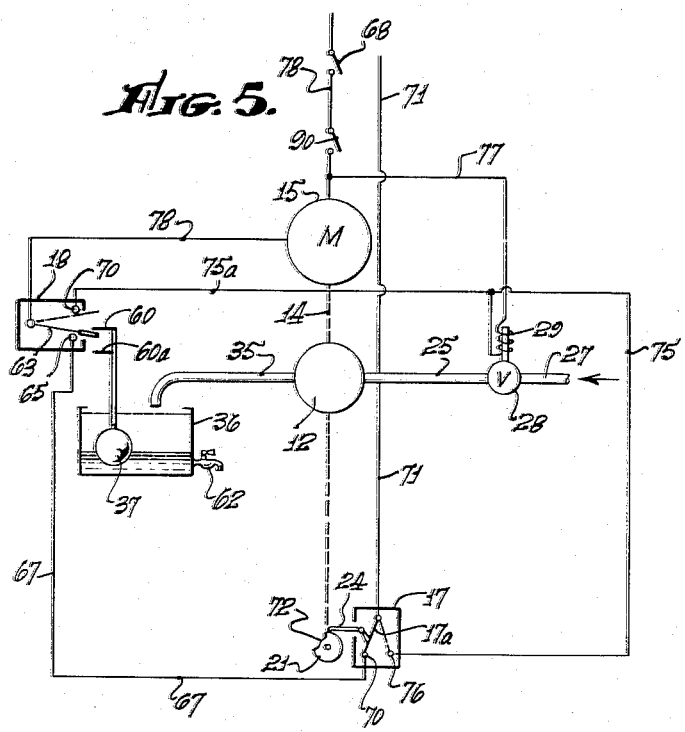
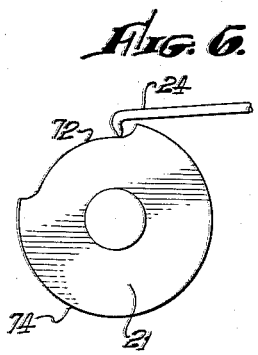
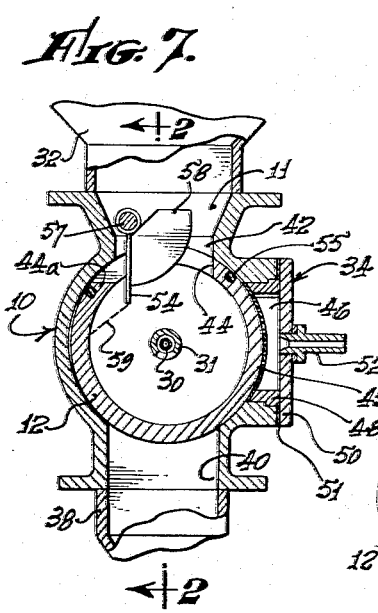
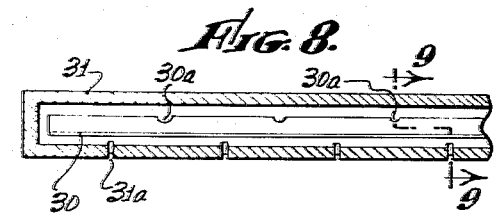
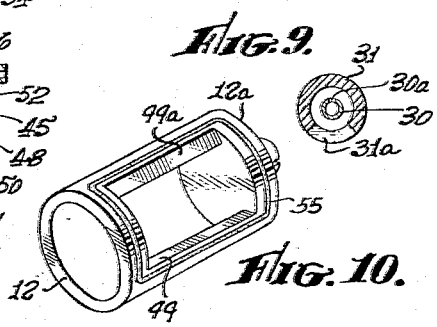
INVENTOR.
JOHN H. FRY
By His Attorneys.
HARRIS, KIECH, FOSTER & HARRIS.

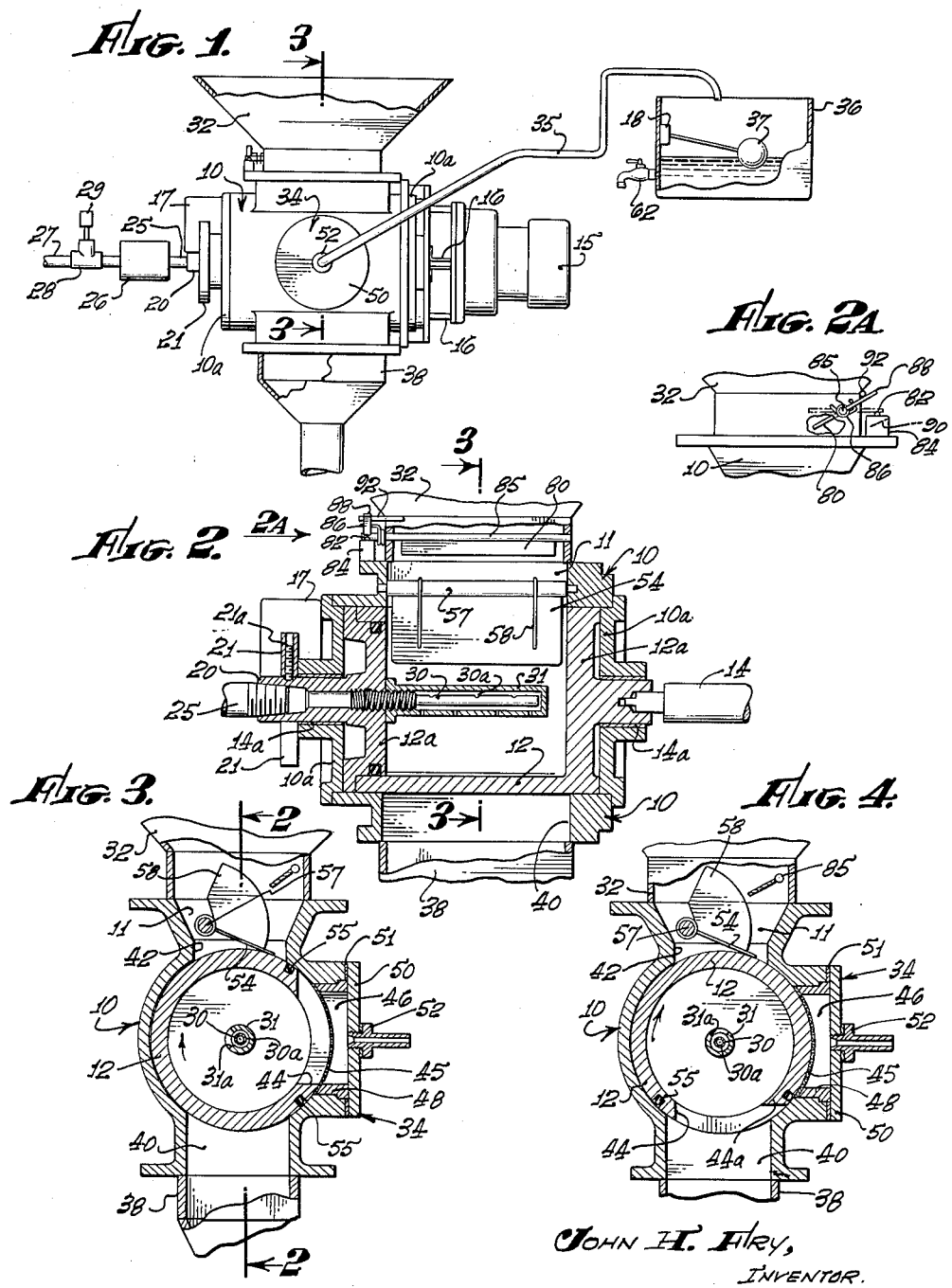

United States Patent Office 2,996,974
Patented Aug. 22, 1961

2,996,974
SINGLE UNIT ROTARY COFFEE BREWER
John H. Fry, 437A Shirley Place, Beverly Hills, Calif.
Filed Oct. 14, 1957, Ser. No. 690,148
13 Claims. (Cl. 99—283)

This invention relates to apparatus for brewing coffee beverage.

This application is a continuation-in-part of my earlier application Serial No. 607,151 filed August 30, 1956.

A particular object of the invention is to provide a simple brewing structure which will yield fresh coffee in relatively small quantities from ground coffee, so that the brew will always be fresh, and which will intermittently and repeatedly furnish such small quantities automatically as long as required.

A further object is to provide an automatic coffee brewer of such simple nature that a single vessel will act to receive and measure fresh, ground coffee, serve as a brewing chamber, and constitute in itself dumping and flushing means.

It is additionally an object to provide a simple coffee brewer, having the single vessel described, which is actuated through its entire cycle by only a single motor, and having such controls as are required, including only a minimum of electrical switches operated only by the brew level and a single cam means driven by the motor.

Another object is to provide for uniform water flow throughout the length of the brewing vessel.

A still further object is to provide in such a simple brewer a simple coffee feeder which compensates for subsequent swelling of the ground coffee charge during the brewing stage.

It is another object of the invention to provide a coffee brewing device which has very few parts, and is exceptionally easy to keep in operative condition.

An additional object is to provide in such a brewer means for breaking a master circuit upon exhaustion of a ground coffee supply.

Other objects of the invention and various features of construction thereof are disclosed in the following specification and the accompanying drawings wherein certain embodiments are illustrated.

In the drawings:

FIG. 1 is a side elevation of the entire structure of a coffee brewer in accordance with this invention, the only omissions being any supporting framework desired and wiring for the electrical mechanism shown;

FIG. 2 is a vertical longitudinal section approximately on the lines 2—2 of FIGS. 3 and 7;

FIG. 2A is an elevational detail taken on the arrow 2A of FIG. 2;

FIG. 3 is a vertical cross section approximately on the lines 3—3 of FIGS. 1 and 2, the rotary brewing vessel being in brewing position;

FIG. 4 is a view similar to that of FIG. 3, the rotary brewing vessel being in dumping position;

FIG. 5 is a wiring diagram for the electrical parts employed, their relationship to the moving parts being indicated therein;

FIG. 6 is an elevational detail showing the cam profile;

FIG. 7 is a view similar to that of FIG. 3 showing the rotary brewing vessel at the commencement of its coffee charging stage;

FIG. 8 is a longitudinal section on an enlarged scale through the hot water distributing shaft structure;

FIG. 9 is a cross section on the line 9—9 of FIG. 8; and

FIG. 10 is an isometric view of the rotary brewing vessel showing the annular packer.

The illustrated brewing structure includes essentially a housing 10, having a feed throat 11, a single rotary brewing vessel 12 having a driven shaft 14, a single electric motor 15 driving such shaft and rotary vessel, a cam on said shaft for operating a switch, a float-operated switch, and wiring.

As shown, the housing 10 is a horizontal housing which may be a machined block having a cylindrical bore receiving the rotary brewing vessel 12 which is a cylinder. The ends of the cylindrical vessel 12 are closed with liquid-tight fixed heads 12a and the housing 10 is provided with fixed heads 10a which enclose the brewing vessel 12, close the ends of the housing 10, and may provide bearings 14a for the motor shaft 14 which is shown as fixed in one head 12a to drive the brewing vessel, and is in turn driven by the electric motor 15 shown as mounted by appropriate brackets 16 on one end of the housing block 10.

As best seen in FIG. 2, an electric single pole double throw switch 17 is secured at the other end of the housing block 10 to the respective housing head 10a. Another similar switch 18 (FIG. 5), which is float-actuated as presently to be described, is the only other switch required. The switch 17 is in position to be actuated from a rotating hollow stub shaft 20, projecting from the respective cylinder head 12a, and carrying a rotating actuating cam 21 fixed on such stub shaft as by a set screw 21a.

The switch 17 is provided with a cam-actuated finger 24 (FIGS. 5 and 6) externally mounted on the switch, such switch having an enclosed switch arm 17a (FIG. 5) movable to and from open and closed positions by the finger 24 and the cam 21 as presently to be described.

Extending from the hollow stub shaft 20 and in line with the drive shaft 14 is a pipe 25 for introducing hot water to the brew vessel 12, the hot water pipe 25 being connected as by a packed swivel joint 26 to a source of supply 27 which is provided with a control valve 28 controlled by a solenoid 29 under control of the switches 17 and 18. The hollow stub shaft 20 receiving the end of the pipe 25 is threaded at its inner end to receive a threaded enlarged end of a water delivery pipe 30 provided at one side with a linear series of delivery holes 30a and extending throughout the length of the pipe 30 and substantially throughout the length of the brewing chamber within the rotary vessel 12, as best indicated in FIG. 2. Surrounding the pipe 30, and threadedly fixed on the threaded portion thereof, is a spray pipe 31 having a series of peripheral spray cuts or slots 31a of 75° to 90° extent to provide fan-shaped sprays, as more fully described later.

The top of the housing 10, as shown, is provided with an elongated rectangular opening, presently to be described, around which is secured the discharge neck of a hopper 32 for fresh, ground coffee. At one side of the housing 10 there is affixed a fitting 34 to receive coffee brew, as also later to be described, and pass it by a hot brew line 35 to a brew-receiving dispensing tank 36, which, in the form shown, contains a float 37 relied upon to control electric circuits to the switches 17 and 18 by the level of the coffee brew. Below the housing 10 there is located a dump funnel 38 for the reception of spent coffee grounds from an elongated rectangular passage 40 in the under side of the housing 10. This lower passage 40 is diametrically opposite, that is directly below, a similar elongated rectangular passage 42 in the top of the housing 10 which receives ground coffee from the above-mentioned hopper 32.

The rotary cylindrical brewing vessel 12 working in the cylindrical bore in the block housing 10 has but a single passage 44 which is of substantially the same size and shape as the size and shape of the two identical passages 40 and 42 in the housing 10, such size and shape being indicated particularly in FIGS. 3, 4 and 7.

The cycle of operation of the rotary brewer 12 commences when the parts are in the position of FIG. 4, which is the same position as when the coffee grounds are dumped into the funnel 38 and the brewing chamber rinsed. This portion of the cycle causes the vessel 12 to rotate in the direction of the curved arrows of FIGS. 3 and 4 to move its elongated passage 44 clockwise from the dump position of FIG. 4 around past the ground coffee feed passage 42 and on to the brewing position of FIG. 3, at which time rotation of the brewing vessel 12 is stopped. Here the brewing operation commences, water being introduced through the hot water pipe 25, past the new open valve 28, through the spray holes 30a and slots 31a, and thence out through the vessel passage 44 by way of the fitting 34 to the hot coffee brew line 35. The fitting 34 includes a filter screening wall 45, curved on the arc of the cylindrical brewing vessel 12. The hot brew passes through the filter wall 45 into a chamber 46 defined by a cylindrical neck 48, which is received in a corresponding bore in the side portion of the housing block 10, and an outer head 50 bound by screws or the like (not shown) to the wall of the housing block 10 and compressing a gasket 51. An appropriate coupling 52 connects the hot coffee brew line 35 to the fitting 34 for delivery of the brew to the previously mentioned dispensing tank 36.

When the brewing operation is finished, the elevated brew level raises the float 37 to actuate the switch 18 and thereby energize the motor 15 to rotate the brewing vessel 12 around to the dump position of FIG. 4, where rotation stops.

From the foregoing description it will be observed that the trailing edge of the passage 44 acts to effect cutting off of the ground coffee feed into the brewing vessel 12 as the latter rotates, this being in conjunction with a swinging coffee-feed control gate 54 presently to be described. A little later the trailing edge of the passage 44 serves to wipe grounds from the perforated filter wall 45 and cut off coffee brew flow as a second stage of the rotation cycle takes place. To insure good contact around the edges of the elongated rectangular passage 44 with the cylindrical bore of the housing 10, an endless rubber annular packer or seal 55 of circular cross section, such as often called an O-ring, is countersunk in a peripheral groove in the outer wall of the rotary vessel 12 at a distance back from each of the edges of the passage 44. This grove is rectangular and the seal 55 as originally produced or pre-formed is preferably rectangular. The seal may, however, be refered to herein as an O-ring. Thus, during the brewing operation when hot water is being introduced under pressure into the brewing chamber 12, a good seal is effected with the inner wall of the cylindrical bore of the housing 10, and for a succeeding portion of the rotary cycle when the passage 44 is moving from the brewing position of FIG. 3 to the dump position of FIG. 4.

Since ground fresh coffee swells quickly in the brewing cylinder vessel 12 in the presence of hot water, it is important to provide for measuring into the vessel 12 an amount of dry ground coffee less than its maximum capacity, especially to avoid jamming of working spaces such as the perforations in the screen 45 and the contact areas around the annular rubber seal 55. For this purpose, the mentioned control flap or gate 54 is used. It is flat and is freely hinged on a transverse pivot pin 57 spanning the throat 11 of the housing 10 and positioned parallel to the axis of the vessel 12. It has a width and length slightly smaller than the width and length of the single passage 44 of the vessel 12, so as to avoid any binding or jamming by the dry ground coffee, and so as to permit its movement in the throat 11 and through the passage 44 between the position of FIGS. 3 and 4 and the position of FIG. 7. To insure free flow of ground coffee, the upwardly facing side of the gate 54 is provided with arcuate upstanding vanes 58 which insure adequate agitation or free flow. When the passage 44 is rotated to the position of FIG. 7, the leading edge of such opening frees the swinging end of the gate 54 so that it drops quickly into the dependent position of FIG. 7, and ground coffee runs into the brew chamber. However, the lowermost edge of the gate depends sufficiently into the chamber to provide behind it a compensating space into which the dry coffee cannot flow (approximately as represented by the doted line 59). This space represents at least the necessary expansion factor to accommodate the swelling of the coffee during the brewing interval. As rotation of the vessel 12 continues, the trailing edge of the passage 44 then engages the rear or under side of the gate 54 and gradually raises it to the closed position of FIG. 3. In the form, shown, the innermost edge portion 44a (FIG. 7) of the passage 44 is positioned so as to be directed immediately toward the back of the gate 54 to engage it first and provide proper leverage for pushing the gate 54 forward and upward. What compression of the ground coffee is required for raising of the gate to the position of FIG. 3 is accomplished easily and without such compaction as to jam the coffee or interfere with subsequent feeding of another charge. A properly measured charge of coffee is thus delivered into the brew vessel 12 when cut off by elevation of the gate 54 and movement of the trailing edge of the passage 44 to the position of FIG. 3.

It will be appreciated that continuous rotation of the vessel 12 has been taking place and this continues until the full brewing position of FIG. 3 is reached, although the brewing stage preferably actually commences as soon as the leading edge of the passage 44 commences its traverse of the filter screen 45 and the brew receiving chamber 46. Rotation stops, under influence of the cam 21 as soon as the full brew position of FIG. 3 is reached, and remains stopped until the brew-receiving tank 36 is filled to the required level and the float 37 actuates the switch 18 and the motor 15 is again energized to cause rotation of the vessel 12 to be resumed.

The next stage is movement to the dumping position of FIG. 4. During a short portion of this movement to the dump position, there should be a connection between the coffee brew chamber 46 behind the filter screen 45 and the discharge passage 40, so as to provide a limited amount of desirable back wash of brew in the chamber 46 from the elevated line 35 backward through the filter perforations to the outlet 40. The width of the passage 44 is sufficient to provide such connection.

During this interval hot water continues to be supplied from the pipe 25 past the water valve 28 so that the water passing through the spray slots 31 thoroughly washes out the coffee grounds and rinses the inner cylindrical wall of the vessel 12. During this stage the spray from the slots 31 is directed upward, and by the time the position of FIG. 4 is fully reached, the grounds have been completely cleared out and washed into the dump funnel 38 before rotation ceases.

Uniform distribution of water into the brew vessel 12, both for brewing purposes and for rinsing purposes is assured by the disclosed structure of the concentric water supplying pipes 30 and 31. As seen in FIGS. 8 and 9, the holes 30a in the inner pipe 30 progressively increase in diameter and capacity toward the closed inner end of the pipe in proportion to compensate for pressure drop as such inner end is approached. As a consequence, the water pressure is uniform throughout the length of the annular space between the two pipes where the inner end thereof is closed by the inner closed end of the outer pipe 31. The slots 31a in the pipe 31 are kerfs of uniform width (e.g. 0.016 inch) such as are made with a circular cutting tool and direct uniform fan-shaped sprays outward against the innermost portions of the inside wall of the vessel 12. The holes 30a are on the side of the pipe 30 diametrically opposite from the ports or slots 31a in the pipe 31. The pipes 30 and 31 are fixed with respect to each other and to the vessel 12, and the fan-shaped sprays are always directed toward the vessel wall portion opposite from the single opening 44. The slots 31a at the opposite ends of the pipe 31 are disposed close to the ends of the pipe 31 to insure thorough spraying of the entire length of the vessel 12 when rinsing, and uniform water distribution through the ground coffee when brewing. Each of these slots 31a extends approximately 90° around the periphery of the pipe 31, or between about 75° and about 90°.

Referring to the wiring diagram of FIG. 5, the float 37 is indicated as moving vertically in the tank 36 and carrying at its upper end switch opening and closing contact-actuating triggers 60 and 60a. When the brew has been dispensed from the tank 36, as by a faucet 62, the float drops close to the bottom of the tank and the upper actuating trigger 60 moves a switch arm 63 of the control switch 18 down to engage a contact 65 and cut in a bypass line 67 leading to the switch 17, whereby to complete the circuit to the motor 15 by reason of the fact that, at this stage, a master switch 68 will have been closed and the switch arm 17a of the switch 17 will be, due to previous actuation, in engagement with a contact 70 to which the line 67 leads, the switch 17 being also connected to a main supply line 71 as indicated.

The motor 15 now turns the drive shaft 14, its cam 21, and the cylindrical brew vessel 12 from the position of FIG. 4 until its single passage 44 is directed upward to communicate with the coffee charging passage 42 whereupon the coffee control gate 54 drops down through the passage 44 as indicated in FIG. 7. During this turning interval, the coffee is charged into the cylindrical vessel 12 which continues to turn from the position of FIG. 7 to the brewing position of FIG. 3, thereby cutting off ground coffee feed.

At the end of this phase the cam 21 has been turned from its position shown in FIG. 5 to the position of FIG. 6 to bring a cam trough 72 under the actuated end of the operating or actuating finger 24 of the switch 17. The finger 24 now drops off its main cam face or crest 74 down into the cam trough 72 and, as by reason of spring-loading, kicks the switch arm 17a from the full-line position of FIG. 5 to the dotted-line position of FIG. 5. The motor circuit is now broken and the motor stops, whereas the circuit to the solenoid coil 29 controlling the water valve 28 is completed through a line 75 leading from the respective terminal 76 of the switch 17 via an extension 77 to the other supply line 78 containing the master switch 68.

The valve 28 having thus been opened, hot water now flows into the brewing vessel 12 via the water supply pipes 25 and 27, issuing through the spray slots 31 to produce brew which leaves the cylinder 12 via the screen 45 and the chamber 46 and passes to the brew-receiving tank 36 via the line 35.

When the brew level rises from its low position, seen in full lines in FIG. 5, to raise the float 37 to the high "full" position indicated in dotted lines in FIG. 5, the switch arm 63 of the control switch 18, having been released by the float trigger 60, is now engaged by the underlying float trigger 60a to raise and snap the switch arm 63 from the full-line position of FIG. 5 to the dotted-line position of FIG. 5. This again closes the circuit through the motor 15 by way of the line 75 and a branch 75a thereof, the switch arm 17a of the switch 17 now being in the dotted-line position to complete such a circuit which is now also completing the circuit through the coil 29 of the water valve 28. The vessel 12 and the cam 21 being now rotated by the motor 15, the actuated outer end of the operating finger 24 of the switch 17 remains in the cam trough 72 (where it was previously disposed) until the cam is rotated to raise such actuated end up on the outer cam face or crest 74. During this latter interval the cylindrical vessel 12 has been moved from the brewing position of FIG. 3 to the dumping and rinsing position of FIG. 4. By the time the cam 21 lifts the operating finger 24 of the switch 17 from the trough 72 to the crest 74, rinsing has been completed. Such lifting now releases the snap switch arm 17a which returns from the dotted-line position of FIG. 5 to the full-line position, thus breaking the circuit through the line 75 and stopping the motor as well as de-energizing the coil 29 controlling the valve 28. The cam trough 72 has in practice approximately the 95° to 100° length indicated.

The brew tank 36 is now full and the system is at rest, the switch arm 17a having, however, been moved to the solid-line position in readiness for again energizing the motor when the float 37 drops to the bottom or full-line position in the tank 36.

For the purpose of de-energizing the entire system should the ground coffee supply in the hopper 32 become exhausted, a coffee-actuated control flap or trip plate 80 may be provided and connected with a control for the main electric supply circuit for the system. This may be effected through a switch or other actuator or control element 82 in a control box 84 connected into the circuit and conveniently mounted on an upper portion of the housing 10 alongside the lower square neck of the hopper 32, as seen in FIGS. 2, 2A and 4. Such a plate 80 is carried by a shaft 85 extending transversely through the hopper 32 parallel to the gate shaft 57, and having one end thereof extending externally where it is provided with a spring 86 to overcome the weight of the plate 80 and any coffee remaining thereon when the coffee supply in the hopper 32 fails. A swinging arm 88 is fixed to the projecting end of the plate shaft 85 and is movable with the plate 80 between the full-line operative position and the broken-line inoperative position of FIG. 2A. The weight of a head of coffee in the hopper moves the plate 80 down against the spring 86 and holds it down, but when the coffee head fails the spring 86 moves the plate 80 up to its inoperative position. In the form shown, when a head of coffee holds the plate down, the arm 88 is held up and releases the control element 82 to close a switch 90 mounted in the box 84 and connected into the electric line 78 containing the master switch 68, thus closing the circuit. When the coffee head becomes exhausted, the spring 86 raises the trip plate 80 and forces down the swinging arm 88 to actuate the control element 82 to break the circuit and de-energize the whole system until the coffee supply in the hopper 32 has been replenished. A stop 92 may be used to limit upward movement of the arm 88.

In order to improve tight sealing about the brew outlet by the O-ring or annular seal 55 when the cylindrical vessel 12 is in the brewing position of FIG. 3, it may be desirable to offset the axis of the vessel 12 very slightly toward the outlet screen 45, so that the O-ring 55 is compressed more in this brewing position than at any other portion of the cycle. This condition may not only improve the liquid seal during brewing, but also improve wiping off the grounds from the screen 45, while reducing sealing ring wear elsewhere such as at the coffee feed location. Such offset of the true axis of the cylindrical vessel 12 from the true axis of the housing 10 radially toward the screen 45 may be around twenty to twenty-five thousandths of an inch, or within a range of perhaps five thousandths to fifty thousandths of an inch, which may be variable also in accordance with the O-ring thickness.

From the foregoing it is apparent that the rotary brewing vessel 12, driven by the single motor 15, constitutes a self-containing unit which at the same time includes a measuring device for the ground coffee charge compensating for swelling, and a brewing chamber through which the hot water is forced under even pressure to produce the brew, the vessel 12 containing its own flushing and rinsing means. Thus, by this simple arrangement, all coffee-making operations take place in a single vessel with a single opening.

I claim as my invention:

1. In combination in coffee-brewing apparatus: a housing having a cylindrical bore with a feed passage in one side, a dump passage in an opposite side, and a brew discharge passage in an intermediate side; a hollow cylindrical brew vessel rotatably mounted in said cylindrical bore, and having a single passage to register successively with said passages of said housing on rotation therein; a motor having a shaft connected to one end of said brew vessel to rotate the latter; hopper means mounted on said housing to feed fresh ground coffee to said feed passage and to said brew vessel through its passage on rotation of said vessel; a hollow axial water supply shaft leading into said brew vessel and having water discharge means therein; means to supply hot water to said hollow shaft and said brew passage for passage of water through said brew vessel and coffee therein; means controlling rotation of said brew vessel and flow of hot water through said vessel, said hollow shaft and said brew discharge passage; and a ground coffee control gate pivoted adjacent the bottom of said hopper means to substantially close said single passage and adapted to depend into said brew vessel and its passage when aligned with the latter, said control gate having a vertical dimension, when depending in said vessel, positioning its lower edge a substantial distance down within said vessel and forming behind said gate a compensating chamber not receiving fed ground coffee, whereby to offset swelling of the ground coffee in said vessel during subsequent brewing contact with water in said vessel.

2. A structure as in claim 1 wherein said gate is a substantially flat plate provided with upstanding means serving as agitators to insure free descent of ground coffee.

3. A structure as in claim 1 wherein said gate is a substantially flat plate.

4. In combination in coffee-brewing apparatus: a housing having a cylindrical bore with a feed passage in one side, a brew discharge passage in a second side, and a dump passage in a third side; a hollow cylindrical brew vessel rotatably mounted in said cylindrical bore, and having a single passage to register successively with said passages of said housing on rotation therein; a motor having a shaft connected to one end of said brew vessel to rotate the latter; hopper means mounted on said housing to feed fresh ground coffee to said feed passage and to said brew vessel through its passage on rotation of said vessel; a hollow axial water supply shaft leading into said brew vessel and having water discharge ports therein; means to supply hot water to said hollow shaft and said brew passage for passage of water through said brew vessel and coffee therein; means controlling rotation of said brew vessel and flow of hot water through said vessel, said hollow shaft and said brew discharge passage; and water delivering means in said brew vessel and connected with said hollow shaft, such delivering means including concentric pipes fixed to said hollow shaft, the inner pipe having a linear series of holes along one side and the outer pipe having a linear series of spray ports along its side opposite from said series of holes, such ports being disposed to direct their sprays away from said single passage in said brew vessel for contacting the inner wall of said vessel opposite said passage.

5. A structure as in claim 4 wherein the areas of said holes in said series increase progressively as they extend inwardly into said vessel to compensate for pressure drop, and said ports have substantially equal capacity to produce uniform water sprays.

6. A structure as in claim 5 wherein said ports are peripheral slots yielding fan-shaped sprays.

7. A structure as in claim 4 wherein said ports are peripheral slots yielding fan-shaped sprays.

8. In combination in beverage-brewing apparatus: a housing having a cylindrical bore with a feed passage in one side, a brew discharge passage in another side, and a dump passage in a third side; a hollow cylindrical brew vessel rotatably mounted in said cylindrical bore, and having a single passage to register successively with said passages of said housing on rotation therein; a motor having a shaft connected to one end of said brew vessel to rotate the latter; hopper means mounted on said housing to feed fresh beverage material to said feed passage and to said brew vessel through its passage on rotation of said vessel; a hollow axial water supply shaft leading into said brew vessel and having water discharge port means therein; means to supply hot water to said hollow shaft and said brew vessel for passage of water through said brew vessel and beverage material therein; a brewed beverage tank for receiving brewed beverage; means for conveying said brewed beverage from said brew discharge passage to said tank; and means for control of rotation of said brew vessel and flow of hot water through said vessel, said hollow shaft and said brew discharge passage, said control means including two switches, a float control for said brewed beverage tank connected to actuate one switch, and a cam connected to rotate with said brew vessel and positioned to actuate the other switch, both of said switches being connected in series in a circuit controlling said motor, and said other switch being in a circuit controlling said hot water supply means.

9. In combination in beverage-brewing apparatus: a housing having a cylindrical bore with a feed passage in one side, a brew discharge passage in another side, and a dump passage in a third side; a hollow cylindrical brew vessel having a cylindrical outer wall rotatably mounted in said cylindrical bore, and having a single passage to register successively with said passages of said housing on rotation therein; a motor having a shaft connected to one end of said brew vessel to rotate the latter; hopper means mounted on said housing to feed fresh beverage material to said feed passage and to said brew vessel through its passage on rotation of said vessel; filter means disposed in said brew discharge passage immediately adjacent said vessel; a hollow axial water supply shaft leading into said brew vessel and spaced from the side wall thereof, said shaft having water discharge parts therein and being connected to rotate with said brew vessel, said discharge ports being located on a side of said hollow shaft opposite from said single passage and being directed toward the inner wall of said brew vessel opposite from said single passage thereof to direct water toward said inner wall; means to supply hot water to said hollow shaft for passage of water through said brew vessel and beverage material therein; means controlling rotation of said brew vessel and flow of hot water through said vessel, said hollow shaft and said brew discharge passage; and a compressible annular packer in the outer wall of said cylindrical brew vessel and around said single passage of said brew vessel, the axis of said brew vessel being slightly offset from the axis of said housing radially toward said brew discharge passage for increased compression of said packer at said brew discharge passage, and whereby said packer in addition to its sealing function may serve to clean said filter means as it passes thereover.

10. In combination in beverage-brewing apparatus: a housing having a cylindrical bore with a feed passage in one side, a brew discharge passage in another side, and a dump passage in a third side; a hollow cylindrical brew vessel having a cylindrical outer wall rotatably mounted in said cylindrical bore, and having a single passage to register successively with said said passages of said housing on rotation therein; a motor motor having a shaft connected to one end of said brew vessel to rotate the latter; hopper means mounted on said housing to feed fresh solid beverage material to said feed passage and to said brew vessel through its passage on rotation of said vessel; a hollow axial water supply shaft leading into said brew vessel and connected thereto to rotate therewith, said shaft having water discharge ports to supply water to solid beverage material in the hollow cylindrical brew vessel; means to supply hot water to said hollow shaft for passage of water through said ports to said brew vessel and beverage material therein; an O-ring packer in the outer wall of said cylindrical brew vessel and around said single passage of said brew vessel, the axis of said brew vessel being slightly offset from the axis of said housing radially toward said brew discharge passage for increased compression of said O-ring at said brew discharge passage; and means controlling rotation of said brew vessel and flow of hot water through said vessel, said hollow shaft, and said brew discharge passage.

11. Beverage-brewing apparatus as in claim 10 including filter means disposed in said brew discharge passage immediately adjacent said brew vessel.

12. Apparatus as in claim 10 wherein said ports are directed away from said single passage toward an inner wall portion of said brew vessel remote from such single passage.

13. In combination in beverage-brewing apparatus: a housing having a cylindrical bore with a feed passage in one side, a brew discharge passage in another side, and a dump passage in a third side; a hollow cylindrical brew vessel rotatably mounted in said cylindrical bore and having a single passage to register successively with said passages of said housing on rotation therein; and annular packing means for providing a fluid-tight seal between said housing and said brew vessel around said single passage of said brew vessel and said brew discharge passage when said single passage of said brew vessel is in register with said brew discharge passage, said brew vessel being slightly offset from the axis of said housing radially toward said brew discharge passage to compress said annular packer when said single passage of said brew vessel is in register with said brew discharge passage.

References Cited in the file of this patent
UNITED STATES PATENTS

| 686,515 | Geddes | Nov. 12, 1901 |
| 1,164,619 | Jefferson | Dec. 14, 1915 |
| 1,804,795 | Lee | May 12, 1931 |
| 1,805,159 | Bauer et al. | May 12, 1931 |
| 1,813,872 | Bausman | July 7, 1931 |
| 2,014,325 | Grilli | Sept. 10, 1935 |
| 2,292,276 | Knoll | Aug. 4, 1942 |
| 2,452,933 | Joppich et al. | Nov. 2, 1948 |
| 2,827,845 | Richeson | Mar. 25, 1958 |

FOREIGN PATENTS

| 279,363 | Germany | Oct. 19, 1914 |
| 373,629 | Great Britain | May 20, 1932 |
| 374,016 | Great Britain | May 25, 1932 |
| 467,300 | Italy | Dec. 1, 1951 |
| 1,118,772 | France | Mar. 26, 1956 |

UNITED STATES PATENT OFFICE
CERTIFICATE OF CORRECTION

Patent No. 2,996,974  
August 22, 1961

John H. Fry

It is hereby certified that error appears in the above numbered patent requiring correction and that the said Letters Patent should read as corrected below.

Column 3, line 15, for "new" read -- now --; line 51, for "refered" read -- referred --; column 8, line 47, for "parts" read -- ports --; line 72, strike out "said", second occurrence; same column 8, line 73, strike out "motor", second occurrence.

Signed and sealed this 30th day of January 1962.

(SEAL)

Attest:

ERNEST W. SWIDER  
Attesting Officer

DAVID L. LADD  
Commissioner of Paten